W. C. STEPHENSON.
TOOL HOLDER.
APPLICATION FILED JAN. 29, 1914.
1,104,014.
Patented July 21, 1914.
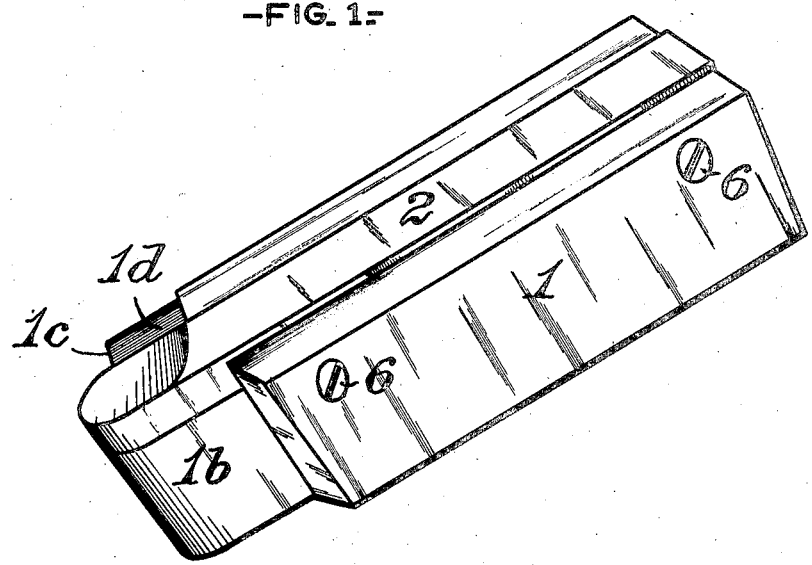
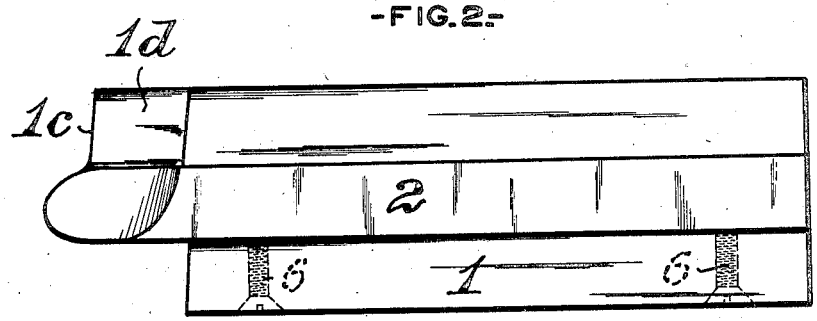
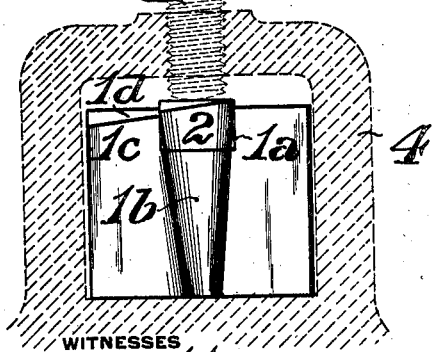
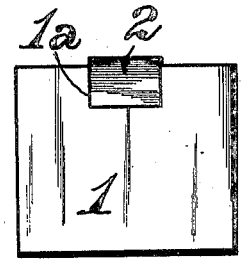

UNITED STATES PATENT OFFICE.

WILLIAM C. STEPHENSON, OF ROCKY MOUNT, NORTH CAROLINA, ASSIGNOR OF ONE-HALF TO JOHN M. DAUGHTRY, OF ROCKY MOUNT, NORTH CAROLINA.

TOOL-HOLDER.

1,104,014. Specification of Letters Patent. Patented July 21, 1914.

Application filed January 29, 1914. Serial No. 815,142.

*To all whom it may concern:*

Be it known that I, WILLIAM C. STEPHENSON, of Rocky Mount, in the county of Edgecombe and State of North Carolina, have invented a certain new and useful Improvement in Tool-Holders, of which improvement the following is a specification.

The object of my invention is to provide means whereby a material reduction in the size and cost of steel tools used for cutting metals may be effected, and such tools be protected from liability to breakage in service, by a holding appliance which is of simple and inexpensive construction and is adapted to the requirements of lathes, planers, boring mills, and other machine tools.

The improvement claimed is hereinafter fully set forth.

In the accompanying drawings: Figure 1 is a view, in perspective, of a tool holder illustrating an embodiment of my invention, with a metal cutting tool in operative position therein; Fig. 2, a plan or top view of the same; Fig. 3, an end view, as seen from the left, the tool holder being indicated as held in a tool post; and Fig. 4, a similar view, as seen from the right.

In the practice of my invention, I provide a tool holder, 1, which is composed of metal of proper strength to withstand the strain imposed upon it by the bearing of a cutting tool upon a piece of work, as, say, carbon steel, and which is in the form of a block of preferably rectangular transverse section, and of slightly shorter length than the tool which it is designed to carry. A longitudinal recess, $1^a$, is formed in the top of the tool holder 1, said recess being of such width as to permit a metal cutting tool, 2, to fit truly within it, and being slightly less in depth than the thickness of the tool, which, in the instance shown, is round nosed, and is ordinarily made of "high speed" alloy steel. A bottom support, $1^b$, is formed on one end of the tool holder, its face being flush with the bottom of the recess, $1^a$, and extends outwardly from the body thereof for a sufficient distance to reach to or near the point of the tool, and a back support, $1^c$, which abuts against the back of the tool, is formed on the top and at one side of the bottom support, and constitutes an extension of the rear wall of the longitudinal slot, $1^a$. The body of the tool holder, on the side opposite the back support, $1^c$, terminates at the inner end of said support, so as to leave a front clearance space for the holder and tool, and an inclined face, $1^d$, is formed on the top of the back support, which coöperates with a correspondingly ground face on the top of the tool to provide clearance for the escape of shavings.

The tool holder is fixed in the tool post or other tool supporting member of a lathe, boring mill, or other machine tool, in any suitable known manner, and is indicated in Fig. 3, as being held in a tool post, 4, by a binding screw, 5, which bears on the top of the tool, 2, and clamps it and the tool holder in operative position. The tool is held in place in the holder, when removed from the machine, by set screws, 6.

It will be seen that when fitted in a tool holder constructed substantially as above described, a metal cutting tool is completely supported on its lower and rear sides, practically up to its nose or cutting edge. Liability to breakage in service is correspondingly reduced, and material economy in the cost of high priced tool steel required is effected, by reason of the fact that a much smaller tool may be used than in the case of those that are supported in tool holders of the forms ordinarily heretofore used.

I claim as my invention and desire to secure by Letters Patent:

1. A tool holder having a longitudinal recess in its top face of less depth than the thickness of the tool to be held, a projection, conforming in shape to the contour of the cutting end of the tool, on the front end of the holder, the top face of said projection forming a continuation of the bottom of said recess, and means to clamp the tool in the holder.

2. A tool holder having a longitudinal recess in its top face of less depth than the tool to be held, an integral projection on the front end of said holder, the top of which forms a continuation of the bottom of said recess and the front end of said projection conforming in shape to the contour of the nose of the tool, and a back support for the tool projecting from the front end of the holder to one side of said recess, the top face of said back support sloping downwardly toward the side of the holder.

3. A tool holder having a longitudinal recess in its body adapted to receive a metal cutting tool, a bottom support for the tool extending outwardly from the body, at one end of said recess, and a back support extending upwardly from the top of the bottom support.

WILLIAM C. STEPHENSON.

Witnesses:
E. V. KYSER,
J. M. GRIFFIN.